United States Patent
Choi

(10) Patent No.: US 9,097,554 B2
(45) Date of Patent: Aug. 4, 2015

(54) METHOD AND APPARATUS FOR DISPLAYING IMAGE OF MOBILE COMMUNICATION TERMINAL

(75) Inventor: Sung-Ha Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 12/645,525

(22) Filed: Dec. 23, 2009

(65) Prior Publication Data

US 2010/0268451 A1 Oct. 21, 2010

(30) Foreign Application Priority Data

Apr. 17, 2009 (KR) ........................ 10-2009-0033834

(51) Int. Cl.
*G01C 21/20* (2006.01)
*B60R 1/00* (2006.01)
*G01C 21/36* (2006.01)

(52) U.S. Cl.
CPC ........ *G01C 21/3679* (2013.01); *G01C 21/3602* (2013.01); *G01C 21/3647* (2013.01)

(58) Field of Classification Search
CPC ........... G01C 21/3679; G01C 21/3602; G01C 21/3647; G01C 21/20; G01C 21/3644; G01C 21/36; G01C 21/26; G01C 21/3614; G01C 21/3682; G01C 21/3673; G01C 21/367; B60R 1/00; G10L 19/26; H04W 4/02; G06Q 10/047; G06Q 30/06; G08G 1/167; G06F 17/30879
USPC ........... 701/533, 431, 400.426; 455/411, 558, 455/66.1, 418; 704/201; 705/14.54; 706/12; 375/220; 348/333, 14.01, 61, 119, 376; 349/139; 340/573.1, 5.61; 356/602; 702/3; 709/207; 345/204; 382/113, 181
See application file for complete search history.

(56) References Cited

U.S. PATENT DOCUMENTS

| 6,081,609 A | * | 6/2000 | Narioka ........................ 382/113 |
| 2002/0133289 A1 | * | 9/2002 | Miyaki ......................... 701/200 |
| 2003/0128123 A1 | * | 7/2003 | Sumiya et al. ............. 340/573.1 |
| 2003/0133129 A1 | * | 7/2003 | Yagi et al. ..................... 356/602 |
| 2003/0164822 A1 | * | 9/2003 | Okada ........................... 345/204 |

(Continued)

FOREIGN PATENT DOCUMENTS

| KR | 10-2005-0041457 A | 5/2005 |
| KR | 10-2009-0000186 A | 1/2009 |

OTHER PUBLICATIONS

European Search Report & Written Opinion issued in Application No. 10 00 3618, mailed Aug. 26, 2010, 7 pages.

(Continued)

*Primary Examiner* — Tuan C. To
*Assistant Examiner* — Yuri Kan
(74) *Attorney, Agent, or Firm* — Fish & Richardson P.C.

(57) ABSTRACT

Techniques are described for allowing a user to intuitively check an actual image captured by a camera, rather than to recognize information regarding a peripheral area (point of interest) on a map. An apparatus includes a camera module that accesses an image captured by a camera and detects a direction in which the camera points and a display unit that displays the captured image. The apparatus also includes a controller that detects a position of a point of interest (POI) corresponding to a keyword and indicates location information for the POI on the displayed image based on the direction information of the to camera, a current location, and the detected location of the POI.

9 Claims, 13 Drawing Sheets

(56) References Cited

U.S. PATENT DOCUMENTS

| | | | |
|---|---|---|---|
| 2004/0128359 A1* | 7/2004 | Horvitz et al. | 709/207 |
| 2004/0263741 A1* | 12/2004 | Koyama et al. | 349/139 |
| 2005/0135465 A1* | 6/2005 | Andrus et al. | 375/220 |
| 2005/0162511 A1* | 7/2005 | Jackson | 348/61 |
| 2005/0177305 A1* | 8/2005 | Han | 701/211 |
| 2006/0015254 A1* | 1/2006 | Smith | 702/3 |
| 2006/0033809 A1* | 2/2006 | Farley | 348/14.01 |
| 2006/0200304 A1* | 9/2006 | Oh | 701/200 |
| 2006/0215020 A1* | 9/2006 | Mori et al. | 348/119 |
| 2007/0033009 A1* | 2/2007 | Kang | 704/201 |
| 2007/0115382 A1* | 5/2007 | Fukuma et al. | 348/333.06 |
| 2007/0198444 A1* | 8/2007 | Movellan et al. | 706/12 |
| 2007/0233373 A1* | 10/2007 | Choi et al. | 701/209 |
| 2008/0140309 A1* | 6/2008 | Jendbro | 701/202 |
| 2008/0267504 A1* | 10/2008 | Schloter et al. | 382/181 |
| 2008/0313039 A1* | 12/2008 | Altberg et al. | 705/14 |
| 2009/0040370 A1* | 2/2009 | Varanasi | 348/376 |
| 2009/0061781 A1* | 3/2009 | Zhang | 455/66.1 |
| 2009/0156190 A1* | 6/2009 | Fisher | 455/418 |
| 2009/0156253 A1* | 6/2009 | Shi et al. | 455/558 |
| 2010/0151825 A1* | 6/2010 | Millet Sancho | 455/411 |
| 2010/0268451 A1* | 10/2010 | Choi | 701/201 |
| 2012/0086549 A1* | 4/2012 | Barnes, Jr. | 340/5.61 |

OTHER PUBLICATIONS

Korean Office Action dated Feb. 26, 2015 for Korean Application No. 10-2009-0033834, 5 pages.

* cited by examiner

FIG. 9

| Fast Food_ | | | | | | ⇐ |
|---|---|---|---|---|---|---|
| A | B | C | D | E | F | G |
| H | I | J | K | L | M | N |
| O | P | Q | R | S | T | U |
| V | W | X | Y | Z | | |
| ⇐ | 12@/ | ÀÀÀ | | OK | | |

FIG. 10

| Local Search | 1/8 |
|---|---|
| Bonbon Chicken | 0.6mi |
| Burger King | 0.3mi |
| May Wah Fast Food | 0.5mi |
| Decarol Fast Food Inc | 0.4mi |
| ⇐  △  ⋀  ∨ | |

| Ny_7_Ge | 3.2mi |
| --- | --- |
| Times Square | 3.6mi |
| Central Park | 3.2mi |
| View East From Empire Sta-te Building By Night | 3.6mi |

METHOD AND APPARATUS FOR DISPLAYING IMAGE OF MOBILE COMMUNICATION TERMINAL

CROSS REFERENCE TO RELATED APPLICATIONS

The present application claims priority to Korean Application No. 10-2009-0033834 filed in Korea on Apr. 17, 2009, the entire contents of which is hereby incorporated by reference in its entirety.

FIELD

The present disclosure relates to displaying an image of a mobile communication terminal.

BACKGROUND

In general, devices for displaying images of a mobile communication terminal display only an image of a subject.

SUMMARY

In one aspect, an apparatus for displaying an image of a mobile communication terminal includes a camera module configured to access an image captured by a camera and determine a direction in which the camera points and a display unit configured to display the captured image. The apparatus also includes a controller configured to determine a current location of the camera and determine a location of a point of interest (POI) corresponding to a keyword received from a user. Based on the determined direction in which the camera points, the determined current location of the camera, and the determined location of the POI, the controller is configured to indicate, on the displayed image, location information for the POI relative to the displayed image.

Implementations may include one or more of the following features. For example, the controller may be configured to display an icon indicating the location of the POI within the displayed image when the location of the POI is within the displayed image. The controller may be configured to display a direction to the POI on the displayed image when the location of the POI is outside of the displayed image.

The apparatus may include a voice output unit configured to provide output describing the location information for the POI by voice. The controller may be configured to display, on the image, a distance from the current location to the determined location of the POI. The controller also may be configured to determine whether the POI is out of range of the image captured by the camera, display a direction to the POI on the image in response to a determination that the POI is out of range of the image captured by the camera, and display the POI on the image in response to a determination that the POI is within range of the image captured by the camera.

In addition, the controller may be configured to determine whether the POI is located at a pre-set location and display the image without a photograph of the POI in response to a determination that the POI is not located at the pre-set location. In response to a determination that the POI is located at the pre-set location, the controller may be configured to display a notification window inquiring whether to display a photograph of the POI on the image and, in response to input requesting display of the photograph being received through the notification window, display the photograph of the POI on the image.

Further, the controller may be configured to receive location information of a mobile communication terminal via a wireless communication network and detect a direction of the mobile communication terminal based on the received location information of the mobile communication terminal, the determined direction in which the camera points, and the current location. The controller may be configured to display the detected direction of the mobile communication terminal on the image.

In another aspect, an apparatus for displaying an image of a mobile communication terminal includes a display unit configured to display an image captured by a camera and a global positioning system (GPS) module configured to detect a current location of the display unit based on GPS information received from satellites. The apparatus also includes a geomagnetic module configured to detect a first absolute azimuth angle of a direction in which the camera points and a camera module configured to detect view angle information of the displayed image based on view angle information of a camera lens used to capture the displayed image. The apparatus further includes a communication unit configured to access peripheral area information of an area corresponding to the current location based on the current location and a controller configured to detect a second absolute azimuth angle between the current location and a point of interest (POI) included in the peripheral area information based on the detected current location and a location of the POI. The controller also is configured to detect an absolute azimuth angle range of the image of the camera based on the first absolute azimuth angle of the direction in which the camera points and the view angle information of the displayed image and display POI information within the image of the camera based on the second absolute azimuth angle and the absolute azimuth angle range.

Implementations may include one or more of the following features. For example, the controller may be configured to determine whether the POI is out of the absolute azimuth angle range of the image of the camera. In this example, the controller also may be configured to display a direction to the POI on the image in response to a determination that the POI is out of the absolute azimuth to angle range of the image of the camera.

In yet another aspect, a method for displaying an image of a mobile communication terminal includes accessing an image captured by a camera, determining a direction in which the camera points, and displaying the captured image. The method also includes determining a current location of the camera and determining a location of a point of interest (POI) corresponding to a keyword received from a user. The method further includes, based on the determined direction in which the camera points, the determined current location of the camera, and the determined location of the POI, indicating, on the displayed image, location information for the POI relative to the displayed image.

Implementations may include one or more of the following features. For instance, the method may include displaying an icon indicating the location of the POI within the displayed image when the location of the POI is within the displayed image. The method also may include displaying a direction to the POI on the displayed image when the location of the POI is outside of the displayed image. The method further may include providing output describing the location information for the POI by voice. In addition, the method may include displaying, on the image, a distance from the current location to the determined location of the POI.

In some examples, the method may include determining whether the POI is out of range of the image captured by the camera. In these examples, the method may include displaying a direction to the POI on the image in response to a determination that the POI is out of range of the image captured by the camera and displaying the POI on the image in response to a determination that the POI is within range of the image captured by the camera.

In some implementations, the method may include determining whether the POI is located at a pre-set location and displaying the image without a photograph of the POI in response to a determination that the POI is not located at the pre-set location. In these implementations, in response to a determination is that the POI is located at the pre-set location, the method may include displaying a notification window inquiring whether to display a photograph of the POI on the image and, in response to input requesting display of the photograph being received through the notification window, displaying the photograph of the POI on the image.

The method may include receiving location information of a mobile terminal via a wireless communication network and detecting a direction of the mobile terminal based on the received location information of the mobile terminal, the determined direction in which the camera points, and the current location. The method also may include displaying the detected direction of the mobile terminal on the image.

In another aspect, a method for displaying an image of a mobile communication terminal includes displaying, on a display unit, an image captured by a camera, detecting a current location of the display unit based on global positioning system (GPS) information received from satellites, and detecting a first absolute azimuth angle of a direction in which the camera points. The method also includes detecting view angle information of the displayed image based on view angle information of a camera lens used to capture the displayed to image and accessing peripheral area information of an area corresponding to the current location based on the current location. The method further includes detecting a second absolute azimuth angle between the current location and a point of interest (POI) included in the peripheral area information based on the detected current location and a location of the POI and detecting an absolute azimuth angle range of the image of the camera based on the first absolute azimuth angle of the direction in which the camera points and the view angle information of the displayed image. In addition, the method includes displaying POI information within the image of the camera based on the second absolute azimuth angle and the absolute azimuth angle range.

Implementations may include one or more of the following features. For example, the method may include determining whether the POI is out of the absolute azimuth angle range of the image of the camera. In this example, the method may include displaying a direction to the POI on the image in response to a determination that the POI is out of the absolute azimuth angle range of the image of the camera.

BRIEF DESCRIPTION OF THE DRAWINGS

FIG. 9 illustrates an example keypad displayed on a display unit;

FIG. 10 illustrates example information about a peripheral POI displayed on the display unit;

FIG. 17 is a flow chart illustrating an example method of displaying a direction of a mobile communication terminal on a real time image of a camera a.

DETAILED DESCRIPTION

Techniques are described for displaying an image of a mobile communication terminal capable of intuitively checking information of a peripheral area (point of interest (POI)) through an actual image captured by a camera and informing about the direction of the POI or a mobile communication terminal of an acquaintance such as a friend.

Figure 1:
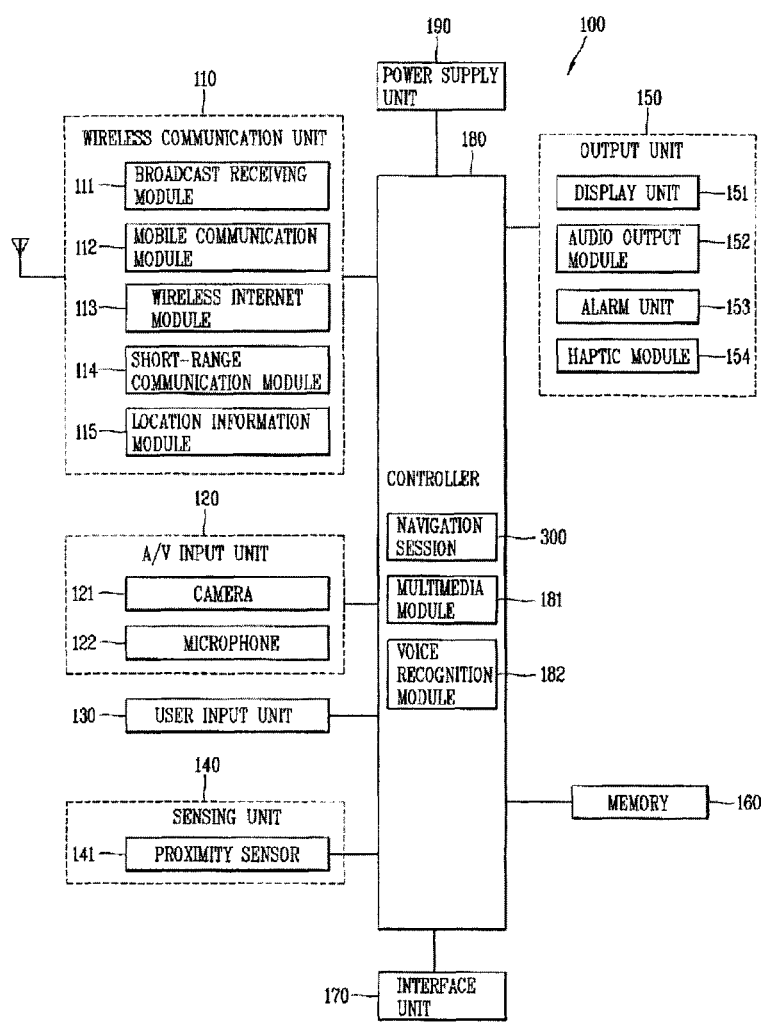
FIG. 1 is a schematic block diagram showing an example configuration of a mobile communication terminal employing an image display apparatus.

FIG. 1 illustrates an example configuration of a mobile communication terminal employing an image display apparatus. The mobile communication terminal 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more to components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The AN input unit 120 is configured to receive an audio or video signal. The AN input unit 120 may include a camera 121 (or other image capture to device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (e.g., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile to communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

The mobile communication terminal 100 may include two or more display units (or other display devices). For example, the mobile communication terminal may include both an external display unit and an internal display unit.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

Recognition of the pointer positioned to be close to the touch screen without being in contact with the touch screen will be called a 'proximity touch', while recognition of actual contacting of a pointer on the touch screen will be called a 'contact touch'. In this case, when the pointer is in the state of the proximity touch, it means that the pointer is positioned to correspond vertically to is the touch screen.

A proximity sensor 141 may detect a proximity touch and a proximity touch pattern (e.g., a proximity touch distance, a proximity touch speed, a proximity touch time, a proximity touch position, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile communication terminal 100 (e.g., a call signal reception sound, a message reception sound, etc.). The audio output module 152 may include a speaker, a buzzer, or other sound generating device.

The alarm unit 153 (or other type of user notification devices) may provide outputs to inform about the occurrence of an event of the mobile communication terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100. For example, the haptic module 154 may be provided at a steering wheel, a gear shift lever, a car seat, and the like.

The memory 160 may store programs used for the processing and controlling operations performed by the controller 180, or may temporarily store data (e.g., a phonebook, messages, still images, video, etc.) that is inputted or outputted.

The memory 160 may include at least one type of storage medium is including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

When the mobile communication terminal 100 is connected with an external cradle, the interface unit 170 may serve as a conduit to allow power from the cradle to be supplied therethrough to the mobile communication terminal 100 or may serve as a conduit to allow various command signals inputted from the cradle to be transferred to the mobile communication terminal therethrough. Various command signals or power inputted from the cradle may operate as signals for recognizing when the mobile communication terminal is properly mounted on the cradle.

The controller 180 typically controls the general operations of the mobile communication terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

A voice recognition module 182 may recognize a voice generated by the user and perform a corresponding function according to the recognized voice signal.

An image display apparatus applied to the mobile communication terminal 100 according to an exemplary embodiment of the present invention includes a camera 121 that captures a particular image in real time, a display unit 151 that displays the particular captured image, and a controller 180 that indicates point of interest (POI) information at a POI positioned within the displayed image.

Figure 2:
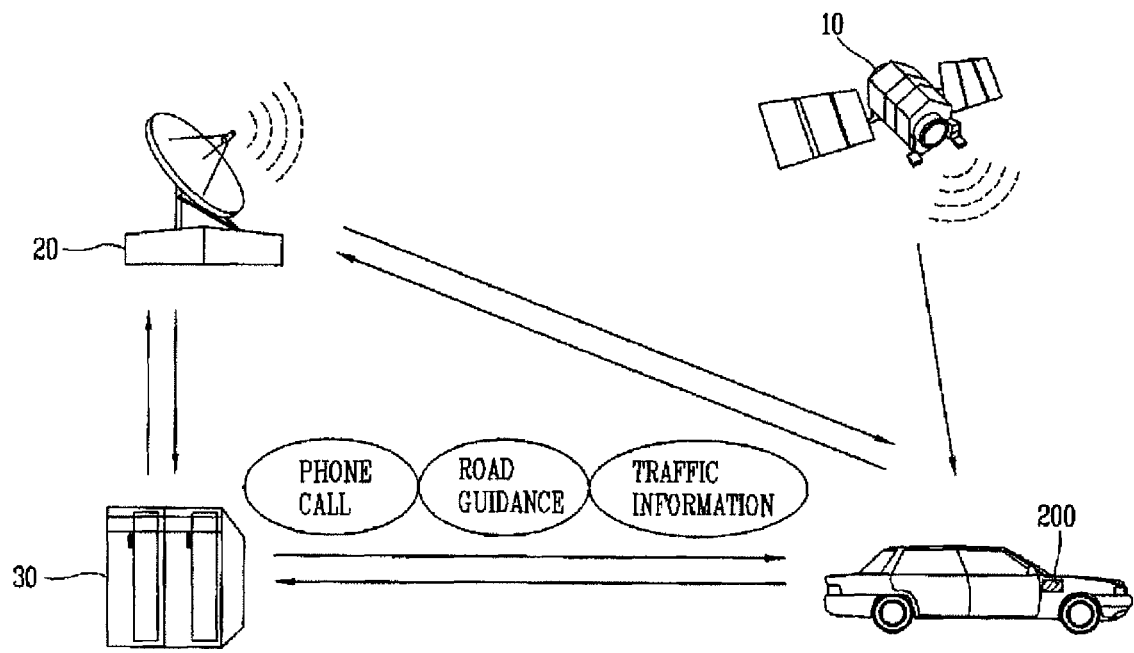
FIG. 2 is a schematic block diagram showing an example vehicle navigation system having a telematics terminal employing an image display apparatus.

FIG. 2 illustrates an example vehicle navigation system that includes a telematics terminal employing an image display apparatus. As shown in FIG. 2, the vehicle navigation system includes an information providing center 30 that provides traffic information and various data (e.g., programs, execution files, etc.), and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information.

Figure 3:
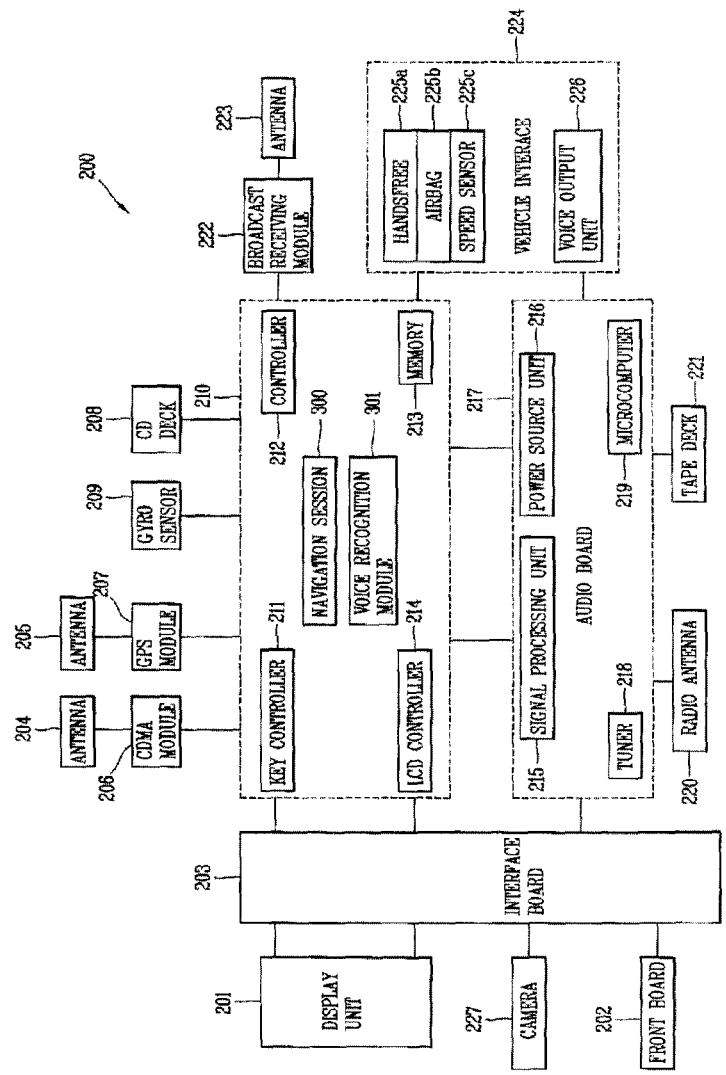
FIG. 3 is a schematic block diagram showing an example configuration of a telematics terminal employing an image display apparatus.

An example configuration of the telematics terminal 200 employing the image display apparatus is described below with reference to FIG. 3. FIG. 3 illustrates an example configuration of the telematics terminal 200 employing the image display apparatus. As shown in FIG. 3, the telematics terminal 200 includes a main board 210 including a central processing unit (CPU) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control process for inputting traffic information according to the situation of a road along which the vehicle currently travels (runs), and information for controlling the process.

The system 200 includes a CDMA module 206, a mobile communication terminal having a unique device number as assigned and installed in the vehicle, a GPS module 207 for receiving a GPS signal for guiding the location of the vehicle or tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 is connected with the main board 210 and receives a broadcast signal via an antenna 223. A display unit (LCD) 201 under the control of the LCD controller 214, a front board 202 under the control of the key controller 211, and a camera 227 for capturing images of the interior and/or exterior of the vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes the proximity sensor to and the touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (e.g., amplifier) 226 may be connected to a vehicle interface 224. For instance, the audio board 217 and the main board 210 are connected to the vehicle interface 224. A handsfree input unit 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

A navigation session 300 applied to the telematics terminal 200 generates road guidance information based on the map data and current location information of the vehicle and provides the road guidance information to a user.

The display unit 201 detects a proximity touch within a display window through the proximity sensor. For example, when a pointer (e.g., user's finger or a stylus) closely touch the display unit 201, the display unit 201 detects the position of the proximity touch and outputs the position information corresponding to the detected location to the controller 212.

A voice recognition unit (or voice recognition module) 301 recognizes a voice pronounced by the user, and performs a corresponding function according to the recognized voice signal.

The GPS module 207 receives a GPS signal transferred from a satellite, and generates first vehicle location data of the navigation device (considered as the same location as the telematics terminal 200 or the mobile communication terminal 100) based on the received GPS signal.

The signal received via the GPS module 207 may be configured to provide the location information of the terminal to a navigation device 400 (shown in FIG. 4) by using a wireless communication scheme such as 802.11, a standard of the wireless network for WLAN including wireless LAN, some infrared communication, and the like, 802.15, a standard for a wireless personal area network (PAN) including Bluetooth™, UWB, ZigBee, and the like, 802.16, a standard for a wireless metropolitan area network (MAN) broadband wireless access (BWA) including a fixed wireless access (FWA), and the like, and 802.20, a standard for the mobile Internet with respect to a mobile broadband wireless access (MBWA) including WiBro, WiMAX, and the like, proposed by IEEE (Institute of Electrical and Electronics Engineers).

The memory 213 stores map data. The stored map data includes geographic coordinates (or longitude/latitude coordinates) representing the to latitude and longitude by DMS (Degree/Minute/Second) unit. In some examples, besides the geographic coordinates, as the stored map data, universal transverse mercator (UTM) coordinates, universal polar system (UPS) coordinates, transverse mercator (TM) coordinates, and the like, may be used.

The memory 213 stores various information such as various menu screen images, a POI, function characteristics information according to a particular position of map data, and the like. The memory 213 stores various user interfaces (UIs) and/or graphic UIs (GUIs). The memory 213 stores data and programs required for operating the telematics terminal 200. The memory 213 stores destination information inputted from the user via an input unit. In this case, the destination information may be a destination or one of a destination and a start point.

The display unit 201 displays image information (or road guidance map) included in the road guidance information generated by the controller 212. Here, the display unit 201 includes a touch sensor (touch screen) or a proximity sensor. The road guidance information may include various information in relation to traveling (running, driving) such as lane information, running limit speed information, turn-by-turn information, traffic security information, traffic guidance information, vehicle information, road search information, and the like, as well as the map data.

When displaying the image information, the display unit 201 may output various contents, such as various menu screen images, road guidance information, and the like, by using a user interface and/or a graphic user interface included in the memory 213. For instance, the contents displayed on the display to unit 201 may include various text or image data (including map data or various information data), and a menu screen image including data such as icons, list menus, combo boxes, and the like.

The voice output unit 226 outputs voice information included in road guidance information (or a voice message with respect to the road guidance information) generated by the controller 212. For instance, the voice output unit 226 may be an amplifier or a speaker.

The controller 212 generates the road guidance information based on the map information and outputs the generated road guidance information to the display unit 201 and the voice output unit 226. Then, the display unit 201 displays the road guidance information.

The controller 212 receives real time traffic information from a terminal (vehicle navigation device) mounted at the information providing center and/or a nearby vehicle.

The controller 212 may be connected to a call center via a communication unit (e.g., the CDMA module 206) to perform call communication, or transmit or receive information between the telematics terminal 200 and the call center. Here, the communication unit may include a handsfree module having a Bluetooth™ function using a short-range radio communication scheme.

Meanwhile, the image display apparatus applied to the telematics terminal 200 includes the camera 227 that captures a particular image in real time; the display unit 201 that displays the captured particular image; and the controller 212 that indicates POI information at a POI positioned within the displayed image.

An example of the configuration of the image display apparatus is described below with reference to FIG. 4. The image display apparatus may be applicable to various terminals such as smart phones, notebook computers, personal digital assistants (PDAs), portable multimedia players (PMPs), and the like, as well as to the mobile communication terminal 100 and the telematics terminal 200.

Figure 4:
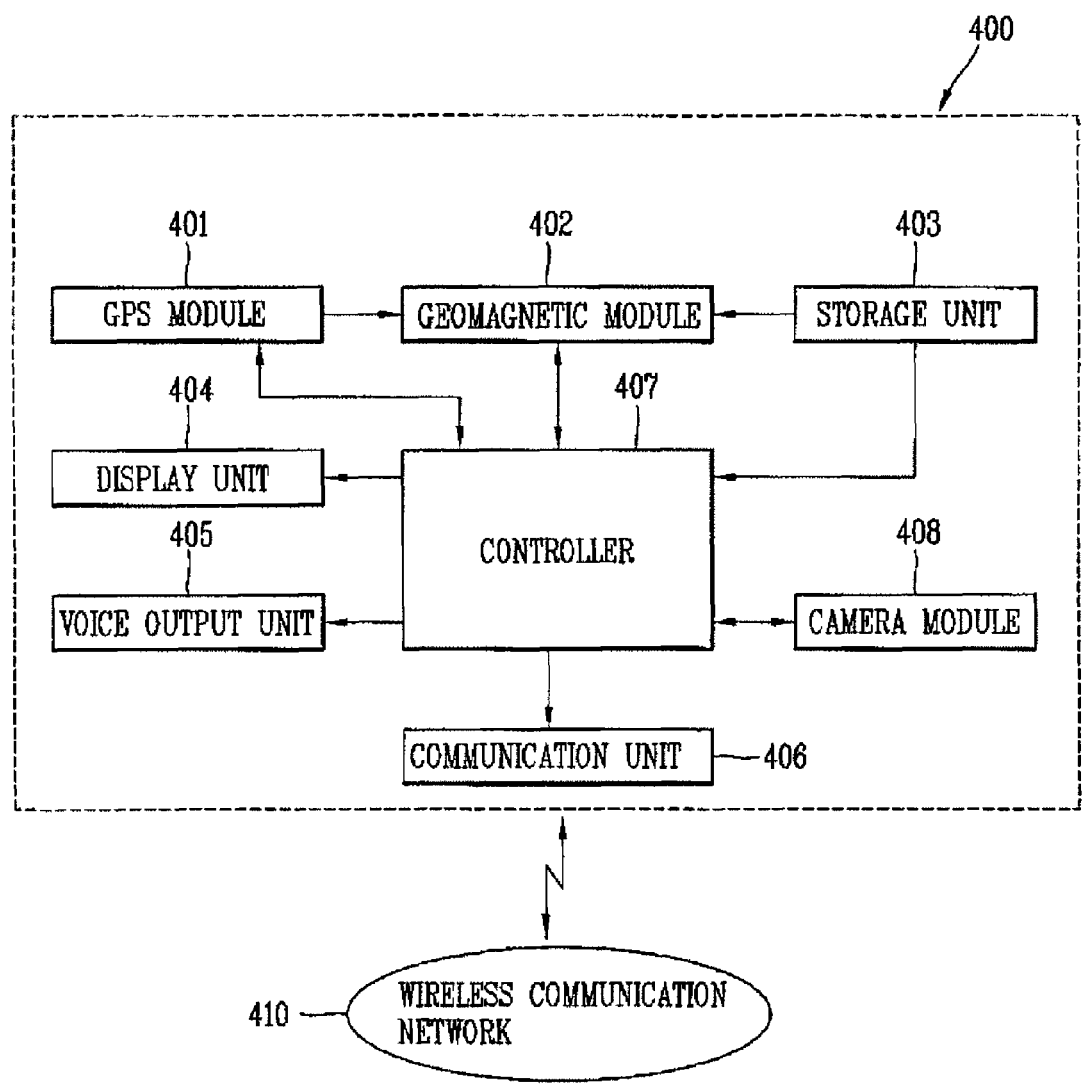
FIG. 4 is a schematic block diagram showing an example configuration of an image display apparatus.

FIG. 4 shows an example configuration of the image display apparatus. As shown in FIG. 4, an image display apparatus 400 includes a storage unit 403 that stores instructions/data used by the image display apparatus 400, a display unit 404 that displays an image captured by a camera, a GPS module 401 that detects a current location based on GPS information received from a satellite, a geomagnetic module (e.g., digital compass module) 402 that detects a first absolute azimuth angle of the direction that the camera points to; a camera module 408 that detects view angle information of the displayed image based on view angle information of a camera lens; a communication unit 406 that receives peripheral area information of the current location (e.g., information regarding major geographical and natural features on the earth, such as a building name, the representative phone number of a building, the address of a building, an area name, location coordinates of an area, an area address, an area photograph including buildings, classification of corresponding areas, etc.) via an external communication network such as the Internet or a wireless communication network 410 based on the current location; and a controller 407. The controller 407 detects a second absolute azimuth angle between the current location and the location (e.g., coordinates of a location of a particular building) of a POI included in the area information based on the detected current location and the POI, detects an absolute azimuth angle range of a real time image of the camera based on the first absolute azimuth angle of the direction that the camera points to and the view angle information of the displayed image, and displays POI information (e.g., detailed information corresponding to a building) at a corresponding POI (e.g., a building) within the real time image of the camera based on the second absolute azimuth angle and the absolute azimuth angle range.

Figure 5:
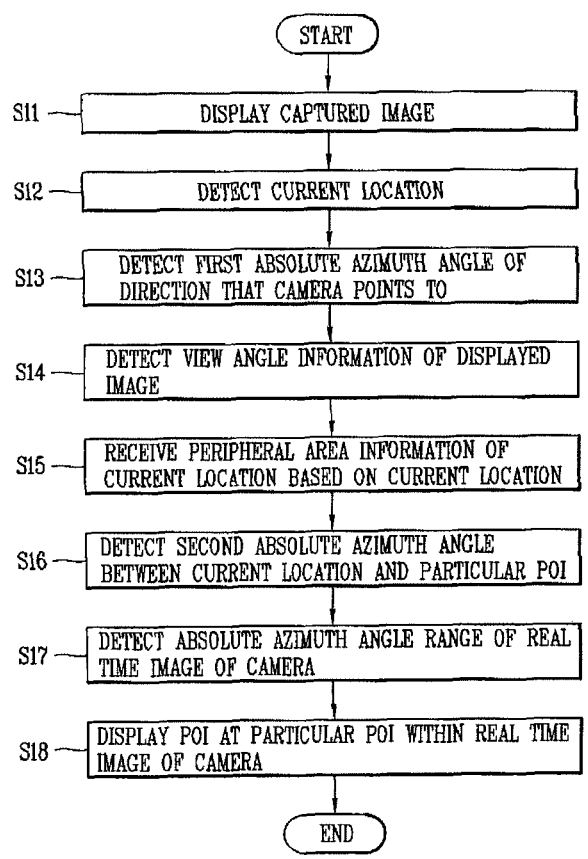
FIG. 5 is a flow chart illustrating an example image display method; is

FIG. 5 illustrates an example image display method. First, the display unit 404 displays an image captured by the camera on a screen in real time (S11). The GPS module 401 detects a current location based on GPS information received from a satellite, and outputs the detected current location to the controller 407 (S12).

The digital compass module 402 detects a first absolute azimuth angle of a direction that the camera points to and outputs the detected first absolute azimuth angle to the controller 407 (S13). For instance, the first absolute azimuth angle of the direction that the camera points to may be detected through GPS information and a movement direction of the mobile communication terminal (e.g., a vehicle proceeding direction of the navigation device). A method that may be used to detect an absolute azimuth angle is disclosed in Korean patent No. 10-0831355.

The camera module 408 detects view angle information of the displayed image based on view angle information of the camera lens and outputs the detected view angle information to the controller 407 (S14).

The communication unit 406 receives peripheral area information of the current location (e.g., information regarding major geographical and natural features on the earth, such as a building name, the representative phone number of a building, the address of a building, an area name, location coordinates of an area, an area address, an area photograph including buildings, classification of corresponding areas, etc.) via an external communication network such as the Internet or a wireless communication network 410 based on the current location, and outputs the received peripheral area information to the controller 407 (S15). For instance, map data including the peripheral area information of the current location may be previously stored in the storage unit 403. The classification of the corresponding area refers to classification such as restaurants, gas stations, markets, banks in the corresponding area, and the classified information may be displayed as icons.

The controller 407 detects a second absolute azimuth angle between the current location and the particular POI based on the detected current location and a particular POI (e.g., coordinates of a location of a particular building) included in the peripheral area information (S16), detects an absolute azimuth angle range of a real time image of the camera based on the first azimuth angle of the direction that the camera points to and view angle information of the displayed image (S17), and displays POI information (e.g., detailed information corresponding to a building) at a corresponding POI (e.g., a building) within the real time image of the camera based on the second absolute azimuth angle and to the absolute azimuth angle range (S18). For example, the image display apparatus may display information regarding the peripheral area (POI) at a position of the POI on the real time image through the camera to implement an augmented reality.

Also, the controller 407 may further display the distance from the current is location to the particular POI on the image based on the current location and the particular POI (e.g., the coordinates of the location of the particular building) included in the peripheral area information. When displaying the POI information at the corresponding POI (e.g., the build-ing) within the real time image of the camera, the controller 407 may display POI information regarding a single POI or POI information regarding a plurality of POIs according to a user selection. Meanwhile, when displaying information about the POI at the POI (e.g., the building) in the real time image of the camera, if the user does not select the particular POI, the controller 407 may display POI information regarding all the geographical and natural features on the earth (all the POIs) included in the area corresponding to a predetermined distance (e.g., ten meters or fifty meters) from the current location, on the image.

The controller 407 may further display a location and direction of a destination on the displayed image based on the current location and destination location information.

When the particular POI (e.g., the particular building) within the real time image of the camera goes beyond the absolute azimuth angle range of the real time image of the camera, the controller 407 may display a symbol such as an arrow indicating the direction that the particular POI is located on the real time image.

When the POI information is displayed at the particular POI (e.g., the building) based on the second absolute azimuth angle and the absolute azimuth angle range of the real time image of the camera, the controller 407 may output the POI information by voice through the voice output unit 405.

An example of displaying POI information at the POI (e.g., the building) within the real time image of the camera based on the second absolute azimuth angle and the absolute azimuth angle range of the real time image of the camera is described below with reference to FIGS. 4 to 6.

Figure 6:
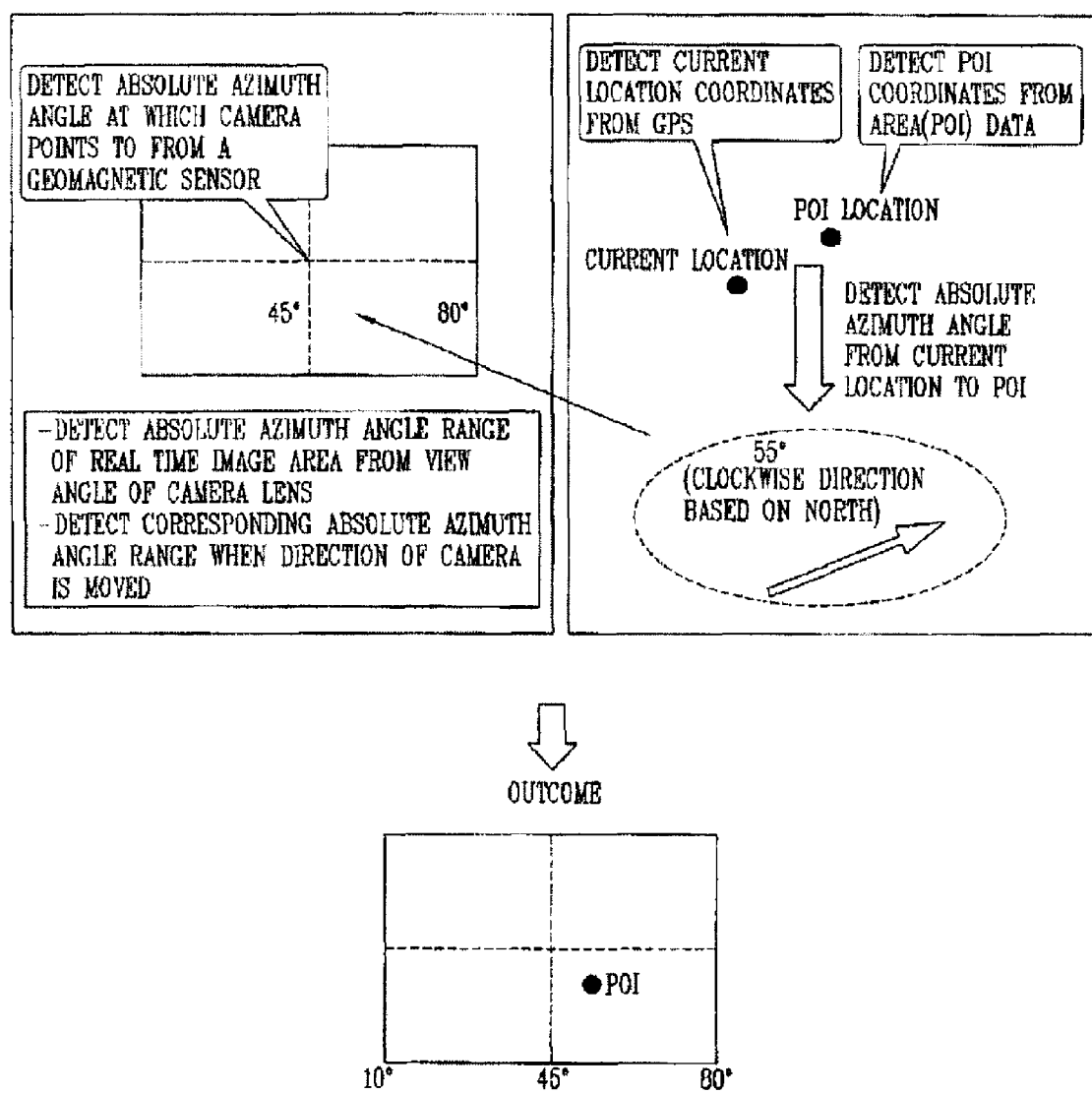
FIG. 6 illustrates an example of displaying information about point of interest (POI) information on a real time image of a camera.

FIG. 6 illustrates an example of displaying information about the POI information on the real time image of the camera. As shown in FIG. 6, the controller 407 detects a second absolute azimuth angle (e.g.,) 55° between the current location and the particular POI based on the current location and the location of the particular POI (e.g., the coordinates of the location of the particular building) included in the peripheral area information, detects an absolute azimuth angle range of the real time image of the camera based on the first absolute azimuth angle of the direction that the camera points to and also based on the view angle information of the displayed image, and displays the POI information (e.g., the detailed information corresponding to the building) as an outcome at the POI (e.g., the building) within the real time image of the camera based on the second absolute azimuth angle and the absolute azimuth angle range of the real time image of the camera.

Accordingly, the image display apparatus can implement the augmented reality by displaying the information regarding the geographical and natural to features on the earth within the real time image through the camera. For instance, the user can intuitively check the information regarding the peripheral area (POI) through the real time image captured by the camera, rather than understanding it on the map.

The image display apparatus of the mobile communication terminal can display the information of the peripheral area (POI) for the user even without map data, the capacity of data mounted in the mobile communication terminal can be reduced.

When the image display apparatus according to the exemplary embodiment of the present invention is applied to the navigation terminal, POI information with location information can be displayed through an image captured by the camera when peripheral area (POI) information is searched from a vehicle.

Figure 7:
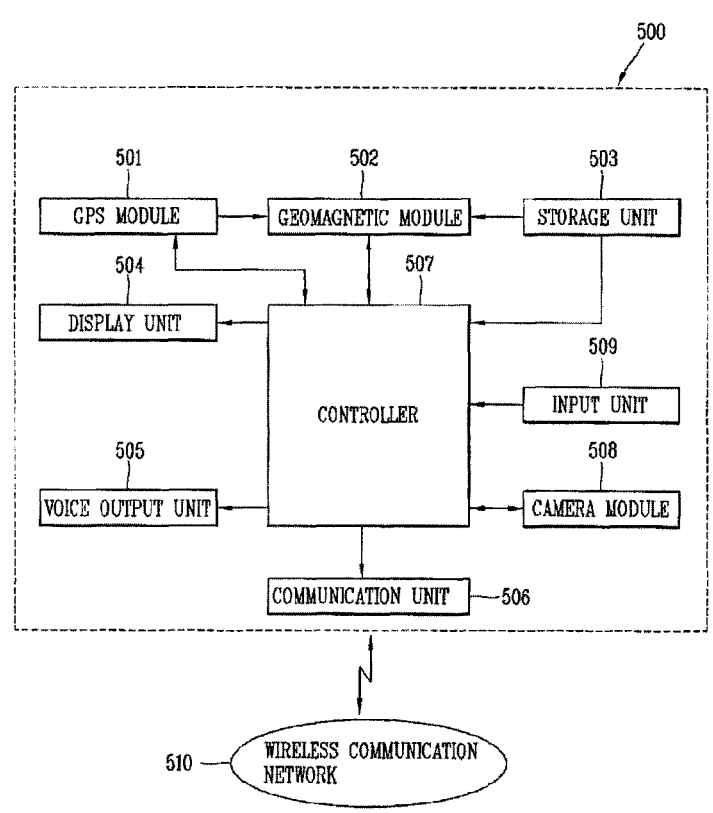
FIG. 7 is a schematic block diagram showing an example configuration of an image display apparatus.

FIG. 7 shows an example configuration of the image display apparatus. As shown in FIG. 7, the image display apparatus 500 includes a storage unit 503 that stores instructions/ data used by the image display apparatus 500, a display unit 504 that displays an image captured by a camera, a GPS module 501 that detects a current location based on GPS information received from a satellite, a geomagnetic module (e.g., digital compass module) 502 that detects a first absolute azimuth angle of the direction that the camera points to; a camera module 508 that detects view angle information of the displayed image based on view angle information of a camera lens; a communication unit 506 that receives peripheral area information of the current location (e.g., information regarding major geographical and natural features on the earth such as, a building name, the representative phone number of a building, the address of a building, an area name, location coordinates of an area, an area address, an area photograph including buildings, classification of corresponding areas, etc.) via an external communication network such as the Internet or a wireless communication network 510 based on the current location; and a controller 507. The controller 507 detects a second absolute azimuth angle between the current location and the location (e.g., coordinates of a location of a particular building) of a POI included in the area information based on the detected current location and the POI, detects an absolute azimuth angle range of a real time image of the camera based on the first absolute azimuth angle of the direction that the camera points to and the view angle information of the displayed image, and displays POI information (e.g., detailed information corresponding to a building) at a corresponding POI (e.g., a building) within the real time image of the camera based on the second absolute azimuth angle and the absolute azimuth angle range.

The controller 507 of the image display apparatus receives a keyword inputted by the user via an input unit 509, detects a location of a POI corresponding to the keyword, determines whether or not the POI is out of an absolute azimuth angle range of the real time image of the camera based on the detected location of the POI, and displays the direction of the POI on the image if the POI is out of the absolute azimuth angle range of the real time image of the camera. For example, when the POI is out of the absolute azimuth angle range of the real time image of the camera, the controller 507 may display a symbol such as an arrow indicating the direction of the POI on the real time image.

When the POI is out of the absolute azimuth angle range of the real time image of the camera, the controller 507 may output the direction of the POI by voice through a voice output unit 505.

An example image display method is described below with reference to FIGS. 7 and 8. Description of operations described above with reference to FIG. 5 is will be omitted.

Figure 8:
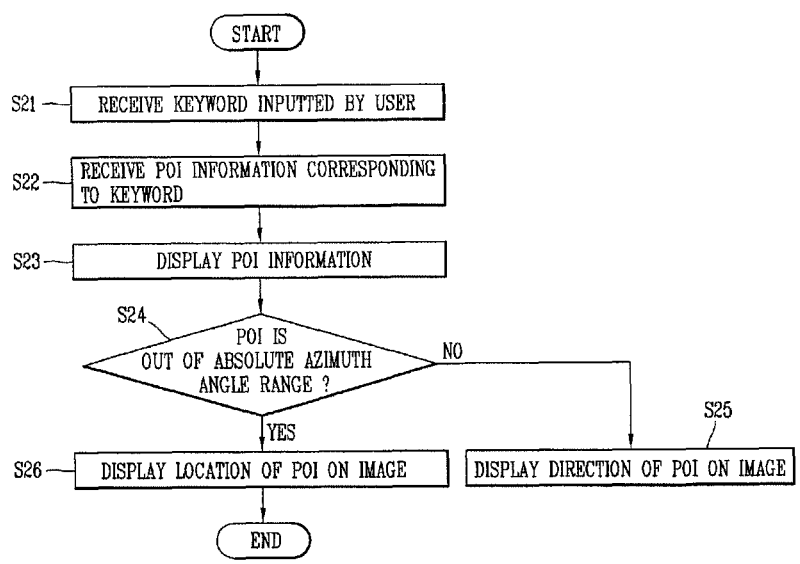
FIG. 8 is a flow chart illustrating an example image display method.

FIG. 8 illustrates an example image display method. First, the input unit 509 receives a keyword inputted by the user, and outputs the received keyword to the controller 507 (S21). For instance, the keyword may include various keywords such as coffee shops (e.g., Starbucks), restaurants (e.g., chicken stores, fast food restaurants, Burger King, etc.), the name of parks, the name of buildings, and the like. For example, the user may input a keyword corresponding to a POI through a keypad displayed on the display unit 504, via the input unit 509. FIG. 9 illustrates an example keypad displayed on the display unit 504.

The controller 507 receives a keyword (e.g., fast food) inputted by the user from the input unit 509, receives information regarding a peripheral POI corresponding to the received keyword from the storage unit 503 or a server via the Internet or a radio communication network 510, and outputs the information regarding the peripheral POI to the display unit 504 (S22).

FIG. 10 illustrates example information about the peripheral POI displayed on the display unit 504. As shown in FIG. 10, the controller 507 receives a keyword inputted by the user from the input unit 509, receives information regarding the peripheral POI corresponding to the received keyword from the storage unit 503 or from the server via the Internet or the radio communication network 510, and outputs the information regarding the peripheral POI on the display unit 504. Then, the display unit 504 displays the information regarding the peripheral POI (S23). The information regarding the peripheral POI refers to information regarding POI corresponding to a pre-set distance (e.g., shorter than 1 mile) from the current location, The pre-set distance may be changed by a designer or the user.

For example, if a keyword inputted by the user via the input unit 509 is fast food, the controller 507 detects fast food restaurants located within the pre-set distance (e.g., 1 mile) from the current location and displays the detected fast food restaurants on the display unit 504. At this time, the controller 407 displays distances from the current location to each fast food restaurant on the display unit 504.

The controller 507 determines whether or not a particular POI selected by the user from information regarding POI (peripheral PI) corresponding to the keyword is out of the absolute azimuth angle range of the real time image of the camera based on the location of the selected particular POI (S24). If the POI is not out of the absolute azimuth angle range of the real time image of the camera, the controller 507 displays the location of the POI on the image. For example, when the POI is within the absolute azimuth angle range of the real time image of the camera, the controller 507 displays the location of the POI on the image (S26). For instance, the controller 507 displays icons or various symbols indicating the location of the POI on the real time image.

Figure 11:
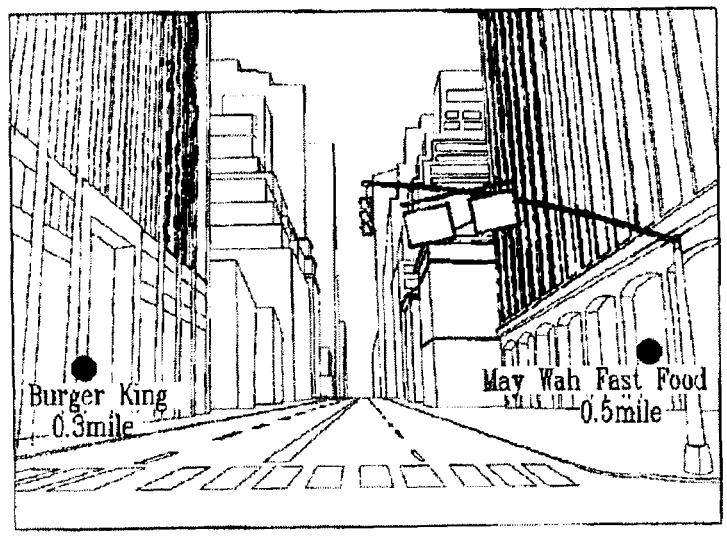
FIG. 11 illustrates example information about a POI displayed on the display unit.

FIG. 11 illustrates an example of information about the POI displayed on the display unit. As shown in FIG. 11, when POI(s) (e.g., Burger King, May Wah Fast Food, etc.) are within the absolute azimuth angle range of the real time image, the controller 507 displays icons and various symbols indicating the locations of the POI on the real time image. Also, the controller 507 displays the distances from the current location to the POIs together with the icons and the various symbols on the real time image.

Meanwhile, when the POI is out of the absolute azimuth angle range of the real time image of the camera (e.g., the range of the image captured by the camera), the controller 507 displays the direction of the POI on the image (S25).

Figure 12:
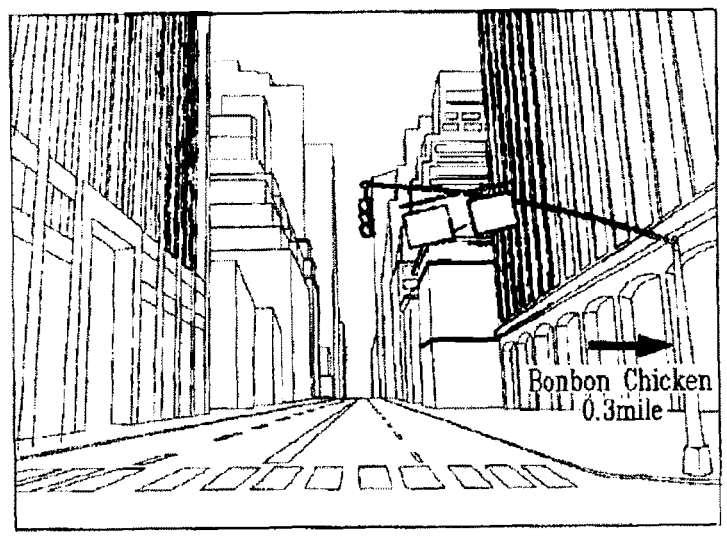
FIG. 12 illustrates an example direction of a POI displayed on a display unit.

FIG. 12 illustrates an example of a direction of the POI displayed on the display unit. As shown in FIG. 12, when the POI (e.g., Bonbon Chicken) is out of the absolute azimuth angle range of the real time image of the camera, the controller 507 may display a symbol such as an arrow indicating the direction of the POI on the real time image. For example, when the POI is out of the absolute azimuth angle range of the real time image of the camera, the controller 507 may display the symbol such as an arrow indicating the direction of the POI on the real time image based on the information about the direction that the camera points to. Any technique of detecting the direction information, the current location and the location of the POI may be used.

Figures 13, 14:
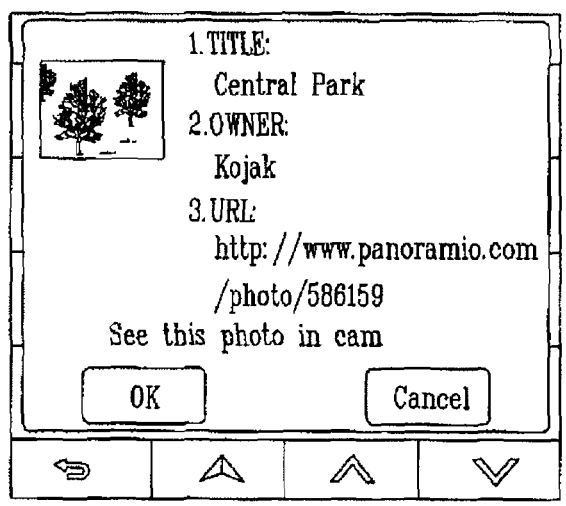
FIG. 13 illustrates examples of how POIs are displayed.
FIG. 14 illustrates an example pop-up window.

FIG. 13 illustrates an example of how POIs are displayed. As shown in FIG. 13, the controller 507 receives a keyword inputted by the user via the input unit 509, receives information about a peripheral POI corresponding to the received keyword from the storage unit 503 or the server via the Internet or the wireless communication network 510, and outputs the information about the peripheral POI on the display unit 504.

If the POI corresponding to the keyword is located at a distance (e.g., away by more than one mile from the current location) that cannot be checked through the camera image, the controller 507 displays a pop-up window (or notification window) inquiring whether to display a photo image of the POI on the image, on the display unit 504.

FIG. 14 illustrates an example pop-up window. As shown in FIG. 14, if a POI (e.g., Central Park) corresponding to the keyword is located at a distance (e.g., away by more than one mile from the current location) that cannot be checked through a camera image, the controller 507 displays a pop-up window inquiring whether to display a photo image of the POI on the image, on the display unit 504.

When the user selects an OK key from the pop-up window inquiring whether to display the photo image of the POI on the image, the controller 507 displays the photo image of the POI on the real time image of the camera. The size of the photo image of the POI may be variably set by the designer or may be changed according to a user request.

Figure 15:
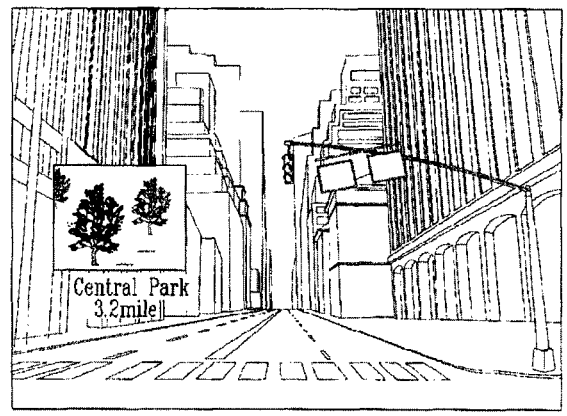
FIG. 15 illustrates an example method of displaying a photo image of a POI on a real time image of a camera.

FIG. 15 illustrates an example of displaying a photo image of a POI on a real time image of a camera. As shown in FIG. 15, if the user selects the OK key from the pop-up window inquiring whether to display the photo image of the POI on the image, the controller 507 displays the photo image of the POI on the real time image of the camera.

Figure 16:
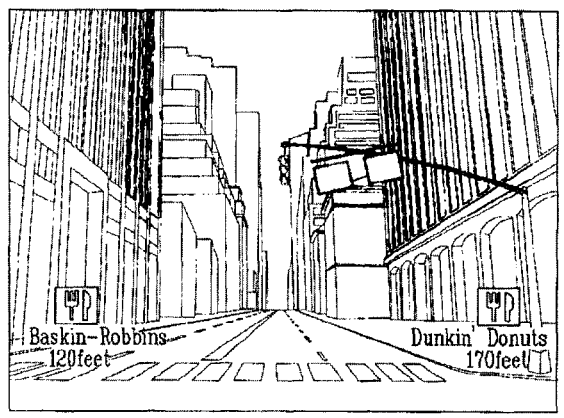
FIG. 16 illustrates an example icon for identifying a POI.

FIG. 16 illustrates an example icon for identifying a POI. As shown in FIG. 16, the controller 507 displays an icon or log for easily discriminating the POI along with the distance from the current location to the POI and the name of the POI on the real time image of the camera. Here, the controller 507 may display various icons for easily discriminating the POI as well as a logo for easily discriminating the POI on the real time image of the camera.

For instance, when the user selects camera, the controller 507 may capture a real time image through the camera or, when a keyword is received by the user, the controller 507 may automatically operate the camera.

An example of displaying the location of a mobile communication terminal (e.g., a friend's mobile communication terminal) on a real time image of the camera is described below with reference to FIGS. 7, 17, and 18. For example, a display method may be useful for a user who is in short of a sense of direction, and also may be useful for a user who wants to check the direction of his friend or when the user has no idea from where he should get on a bus, or the like.

Figure 17:
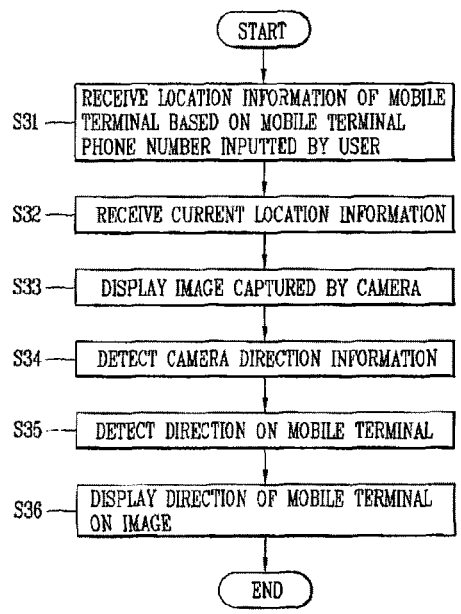

FIG. 17 illustrates an example method of displaying the direction of a mobile communication terminal on a real time image of the camera. First, when a friend search menu is selected by the user, the controller 507 receives a phone number of a mobile communication terminal inputted by the user via the input unit 509. The controller 507 receives location information of the mobile communication terminal from a call center via the wireless communication network 500 based on the phone number of the mobile communication terminal (S31).

The controller 507 receives current location information via the GPS module 501 (S32), and displays a real time image captured by the camera on the display unit 504 (S33). The camera module 508 detects a direction that the camera points to (camera direction information), and outputs the detected camera direction information to the controller 507 (S34).

The controller 507 detects the direction of the mobile communication terminal based on the current location information, the location information of the mobile communication terminal, and the camera direction information (S35), and displays the detected direction of the mobile communication terminal on the real time image which has been captured by the camera (S36).

Figure 18:
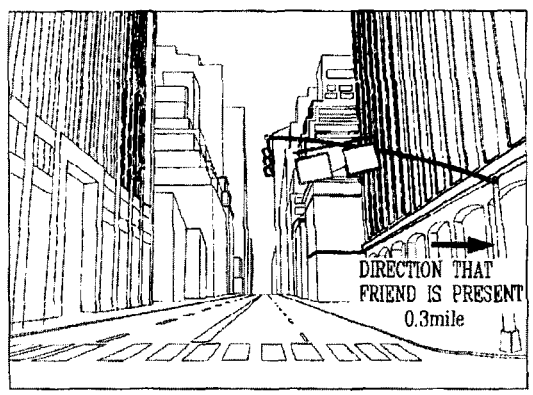
FIG. 18 illustrates an example method of displaying a direction of a mobile communication terminal on a real time image of a camera.

FIG. 18 illustrates an example of displaying the direction of the mobile communication terminal on the real time image of the camera. As shown in FIG. 18, the controller 507 detects the direction of the mobile communication terminal (e.g., the friend's mobile communication terminal) based on the current location information, the camera direction information, and the mobile communication terminal (e.g., the friend's mobile communication terminal), and displays the detected direction of the mobile communication terminal (e.g., the direction of the friend) on the real time image which has been captured by the camera.

In some implementations, information about a peripheral area (POI) is not recognized from a map but can be intuitively checked through an actual image captured by a camera. Because information about a peripheral area (POI) can be displayed for the user, without using map data, the capacity of data mounted in the mobile communication terminal can be reduced.

With the image display apparatus applied for a navigation terminal, when information about a peripheral area (POI) is searched from a vehicle, the information about a POI having location information can be displayed through an image captured by the camera. The direction of a POI or a mobile communication terminal of an acquaintance such as a friend can be informed, so it can be useful for a user who is short of a sense of direction. And also, the described techniques may be useful for a user who wants to check the direction of his friend or when the user has no idea where he should get on a bus, or the like.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A mobile communication terminal, comprising:
a camera configured to capture an image;
a display unit configured to display the captured image;
an input unit; and
a controller configured to:
determine a current location of the mobile communication terminal,
determine a location of a point of interest (POI) corresponding to a keyword from the input unit,
determine that the POI is located at a direction which is not displayed on the captured image based on the capturing direction of the camera, the current location of the mobile communication terminal, and the location of the POI, and
indicate, on the captured image, a distance from the current location of the mobile communication terminal to the location of the POI and a direction of the POI, based on the determination that the POI is located at the direction which is not displayed on the captured image,
wherein the controller is further configured to:
determine that the POI is located out of a pre-set distance that is not displayed on the captured image, the pre-set distance corresponding to the capturing direction of the camera, display a notification window inquiring whether to display a photograph of the POI on the captured image, based on the determination that the POI is located out of the pre-set distance, receive, an input requesting display of the photograph of the POI through the input unit, and display the photograph of the POI on the captured image based on the input.

2. The mobile communication terminal of claim 1, wherein the controller is configured to display an icon indicating the direction of the POI within the displayed captured image.

3. The mobile communication terminal of claim 1, further comprising:

a voice output unit configured to output location information for the POI by voice.

4. The mobile communication terminal of claim 1, wherein the controller is configured to determine whether the POI is out of range of the captured image, display the direction of the POI on the captured image in response to a determination that the POI is out of range of the captured image, and display the POI to on the captured image in response to a determination that the POI is within range of the captured image.

5. A method for displaying an image of a mobile communication terminal, the method comprising:

capturing, by a camera, an image corresponding to a capturing direction of the camera;

displaying the captured image on a display unit;

determining, by at least one controller, a current location of the mobile communication terminal;

determining, by the at least one controller, a location of a point of interest (POI) corresponding to a keyword from an input unit;

determining, by the at least one controller, that the POI is located at a direction which is not displayed on the captured image, based on the capturing direction of the camera the current location of the mobile communication terminal, and the location of the POI;

indicating, on the captured image and by the at least one controller, a distance from the current location of the mobile communication terminal to the location of the POI and a direction of the POI, based on the determination that the POI is located at the direction which is not displayed on the captured image;

determining, by the at least one controller, that the POI is located out of a pre-set distance that is not displayed on the captured image, the pre-set distance corresponding to the capturing direction of the camera;

displaying, by the at least one controller, a notification window inquiring whether to display a photograph of the POI on the captured image, based on the determination that the POI is located out of the pre-set distance;

receiving, by the at least one controller, an input requesting display of the photograph of the POI; and displaying, by the at least one controller, the photograph of the POI on the captured image, based on the input.

6. The method of claim 5, wherein indicating, by the at least one controller, the direction of the POI comprises:

displaying, by the at least one controller, an icon indicating the direction of the POI within the displayed image corresponding to the capturing direction of the camera.

7. The method of claim 5, further comprising:

outputting, by the at least one controller, location information for the POI by voice.

8. The method of claim 5, wherein indicating, by the at least one controller, the direction of the POI comprises:

determining, by the at least one controller, whether the POI is out of range of the captured image;

displaying, by the at least one controller, the direction of the POI on the captured image in response to a determination that the POI is out of range of the captured image, and displaying, by the at least one controller, the POI on the captured image in response to a determination that the POI is within range of the captured image.

9. The method of claim 5:

wherein determining, by the at least one controller, the location of the POI which is not displayed on the image comprises determining a location of a building which cannot be displayed on the captured image;

wherein indicating, by the at least one controller, on the captured image, the distance from the current location to the location of the POI and the direction of the POI comprises indicating, on the captured image, a distance from the current location to the location of the building and a direction of the building;

wherein displaying, by the at least one controller, the notification window inquiring whether to display the image of the POI on the image corresponding to the capturing direction of the camera comprises displaying a notification window inquiring whether to display a photograph of the building on the captured image; and wherein displaying, by the at least one controller, the photograph of the POI on the captured image comprises displaying the photograph of the building on the captured image.

* * * * *